(12) United States Patent
Nelliappan et al.

(10) Patent No.: US 9,617,415 B2
(45) Date of Patent: *Apr. 11, 2017

(54) POLYCARBONATE BLEND AND METHOD OF PRODUCING THE SAME

(71) Applicant: Rohm & Haas Company, Philadelphia, PA (US)

(72) Inventors: Veera G. Nelliappan, North Wales, PA (US); Eric G. Lundquist, North Wales, PA (US); Yannick Saint-Gerard, Roqueford-les-pins (FR)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/387,880

(22) PCT Filed: Mar. 5, 2013

(86) PCT No.: PCT/US2013/028966
§ 371 (c)(1),
(2) Date: Sep. 25, 2014

(87) PCT Pub. No.: WO2013/154694
PCT Pub. Date: Oct. 17, 2013

(65) Prior Publication Data
US 2015/0073095 A1    Mar. 12, 2015

Related U.S. Application Data

(60) Provisional application No. 61/622,362, filed on Apr. 10, 2012.

(51) Int. Cl.
*C08L 69/00* (2006.01)
*C08L 33/12* (2006.01)

(52) U.S. Cl.
CPC .................... *C08L 69/00* (2013.01)

(58) Field of Classification Search
CPC .... C08L 69/00; C08F 2/38; C08F 2/40; C08F 2/42; C08F 20/14; C08F 120/14; C08F 220/14
See application file for complete search history.

(56) References Cited

U.S. PATENT DOCUMENTS

| | | | | |
|---|---|---|---|---|
| 3,280,172 | A * | 10/1966 | Teague | C07C 69/54 560/221 |
| 4,593,081 | A * | 6/1986 | Bobsein | C08F 20/12 525/330.4 |
| 4,661,571 | A * | 4/1987 | Kato | C08F 20/14 526/213 |
| 4,758,626 | A | 7/1988 | Ishihara et al. | |
| 4,906,696 | A | 3/1990 | Fischer et al. | |
| 5,200,492 | A * | 4/1993 | Ohnaga | C08L 33/12 428/412 |
| 2008/0146726 | A1* | 6/2008 | Jang | C08L 33/12 524/508 |
| 2015/0051349 | A1* | 2/2015 | Nelliappan | B29C 43/22 525/185 |

FOREIGN PATENT DOCUMENTS

| | | | |
|---|---|---|---|
| EP | 0483717 | | 6/1992 |
| EP | 1932885 | | 6/2008 |
| WO | WO-2012058256 | * | 5/2012 |
| WO | WO 2013/154694 | | 10/2013 |

OTHER PUBLICATIONS

SIGMA-ALDRICH data sheet for Poly(methyl acrylate); no date.*
SIGMA-ALDRICH data sheet for Poly(glycidyll methacrylate); no date.*
SIGMA-ALDRICH data sheet for Poly(methyl methacrylate); no date.*
SIGMA-ALDRICH data sheet for Poly(cyclohexyl methacrylate); no date.*
SIGMA-ALDRICH data sheet for Poly(2,4,6 tribromophenyl methacrylate); no date.*
EP Response to Office Action Mar. 2, 2015; from EP counterpart Application No. 13 709 705.1.
PCT Search Report dated May 22, 2013; from corresponding PCT Application No. PCT/US2013/028966.
PCT IPRP dated Oct. 23, 2014; from corresponding PCT Application No. PCT/US2013/028966.
EP Office Action dated Nov. 21, 2014; from EP counterpart Application No. 13709705.1.
Chinese Office Action dated Sep. 2, 2015; from Chinese counterpart Application No. 201304889-7.201380019175.0.
Chinese Office Action dated Apr. 19, 2016; from Chinese counterpart Application No. 201380019175.0.
Chinese Office Action received Oct. 19, 2016; from Chinese counterpart Application No. 201380019175.0.
Taiwan Office Action dated Aug. 17, 2016, from Taiwan counterpart Application No. 102107624.
Japanese Office Action received Dec. 1, 2016; from counterpart Japanese Application No. 2015-505715.

* cited by examiner

*Primary Examiner* — David Buttner

(57) ABSTRACT

A blend comprising from 50 to 95 percent by weight polycarbonate; and from 5 to 50 percent by weight modified methyl methacrylate polymer, wherein the modified methyl methacrylate polymer is selected from the group consisting of modified methyl methacrylate homopolymer, modified methyl methacrylate copolymers, and combinations thereof; wherein the modified methyl methacrylate polymer has one or more end groups provided by reaction with one or more chain transfer agents selected from the group consisting of mercapto esters, cycloalkyl and substituted cycloalkyl thiols, hydroxyl thiols, aryl and substituted aryl thiols, and aminoalkyl thiols, wherein the modified methyl methacrylate polymer has a Mw from 5,000 to 100,000 g/mole; and wherein the blend exhibits a pencil hardness equal to or greater than F measured according to ASTM D3363-05 is provided. A method for preparing a polycarbonate/modified methyl methacrylate blend is also provided.

4 Claims, No Drawings

POLYCARBONATE BLEND AND METHOD OF PRODUCING THE SAME

FIELD OF INVENTION

The instant invention relates to a scratch resistant polycarbonate blend and method of producing the same.

BACKGROUND OF THE INVENTION

Generally, polycarbonate (PC) compositions exhibit properties such as high impact strength, flame retardancy and good transparency and for these reasons is the engineering resin of choice in electronic, appliance and automotive applications. Unfortunately, polycarbonate compositions have poor scratch resistance. One method of dealing with poor scratch resistance entails an expensive hard coating step in which a protective coating is applied to the surface of a PC article. Thus, a less expensive additive which could be blended with PC to produce a scratch resistant PC would be of commercial value.

Blends of polycarbonates and polymethyl methacrylate (co)polymers are known and have been investigated as a method of improving the scratch resistance of PC. Unfortunately, blends of PC and typical polymethyl methacrylates (PMMAs) are frequently opaque, which is not acceptable for semi-transparent or transparent applications, and they often suffer from poor mechanical properties.

Moreover, PC and PMMA are immiscible in most proportions, and blends thereof are opaque over wide composition ranges and do not possess the advantageous properties exhibited by either polymer.

Techniques of overcoming the drawbacks associated with the immiscibility of typical PC/PMMA blends have been previously proposed. Among such techniques is the addition of copolymer additives, such as PMMA/acrylamide copolymers and PMMA-ester copolymers containing carbocyclic groups and the use of a block copolymer of PC and PMMA instead of a physical mixture of the two components.

A need exists for a modified PC composition, having an increase of three to four levels of hardness on the pencil hardness scale over the unmodified PC composition, that eliminates the need for a hard coating step.

SUMMARY OF THE INVENTION

The instant invention provides a scratch resistant polycarbonate blend, and method of producing the same.

In one embodiment, the instant invention provides a blend comprising: from 50 to 95 percent by weight polycarbonate; and from 5 to 50 percent by weight modified methyl methacrylate polymer, wherein the modified methyl methacrylate polymer is selected from the group consisting of methyl methacrylate homopolymer, methyl methacrylate copolymers and combinations thereof; wherein the modified methyl methacrylate polymer has one or more end groups provided by reaction with one or more chain transfer agents selected from the group consisting of mercapto esters, cycloalkyl and substituted cycloalkyl thiols, hydroxyl thiols, aryl and substituted aryl thiols, and aminoalkyl thiols; and wherein the modified methyl methacrylate polymer has a weight average molecular weight, Mw, from 5,000 to 100,000 g/mole; and wherein the blend exhibits a pencil hardness equal to or greater than F measured according to ASTM D3363-05.

In an alternative embodiment, the instant invention further provides a method for improving scratch resistance of polycarbonate comprising: forming a blend by melt blending, the blend comprising from 50 to 95 weight percent polycarbonate and from 5 to 50 weight percent modified methyl methacrylate polymer; wherein the modified methyl methacrylate polymer has one or more end groups provided by reaction with one or more chain transfer agents selected from the group consisting of mercapto esters, cycloalkyl and substituted cycloalkyl thiols, hydroxyl thiols, aryl and substituted aryl thiols, and aminoalkyl thiols; and wherein the modified methyl methacrylate polymer has an Mw equal from 5,000 to 100,000 g/mole.

DETAILED DESCRIPTION OF EMBODIMENTS OF THE INVENTION

The following abbreviations are used herein:
"PMMA" means polymethmethacrylate;
"PC" means polycarbonate;
"BMP" means butyl mercapto propionate;
"MMA" means methyl methacrylate;
"(meth)acrylate" means acrylate or methacrylate;
"CHMA" means cyclohexmethyl methacrylate;
"nDDM" means normal dodecylmercaptan;

The instant invention provides a scratch resistant polycarbonate blend, method of producing the same, and articles made therefrom.

The blend according to the present invention comprises from 50 to 95 percent by weight polycarbonate; and from 5 to 50 percent by weight modified methyl methacrylate polymer, wherein the modified methyl methacrylate polymer is selected from the group consisting of methyl methacrylate homopolymer, methyl methacrylate copolymers and combinations thereof; wherein the modified methyl methacrylate polymer has one or more end groups provided by reaction with one or more chain transfer agents selected from the group consisting of mercapto esters, cycloalkyl and substituted cycloalkyl thiols, hydroxyl thiols, aryl and substituted aryl thiols, and aminoalkyl thiols; wherein the modified methyl methacrylate polymer has a Mw from 5,000 to 100,000 g/mole; and wherein the blend exhibits a pencil hardness equal to or greater than F measured according to ASTM D3363-05.

In an alternative embodiment, the instant invention further provides a method for improving scratch resistance of polycarbonate comprising: forming a blend by melt blending, the blend comprising from 50 to 95 weight percent polycarbonate and from 5 to 50 weight percent modified methyl methacrylate polymer; wherein the modified methyl methacrylate polymer has one or more end groups provided by reaction with one or more chain transfer agents selected from the group consisting of mercapto esters, cycloalkyl and substituted cycloalkyl thiols, hydroxyl thiols, aryl and substituted aryl thiols, and aminoalkyl thiols; and wherein the modified methyl methacrylate polymer has a Mw equal from 5,000 to 100,000 g/mole and wherein the blend exhibits a pencil hardness equal to or greater than F measured according to ASTM D3363-05.

All individual values and subranges from 50 to 95 percent by weight polycarbonate are included herein and disclosed herein; for example, the amount of PC in the blend can be from a lower limit of 50, 60, 70, 80 or 90 percent by weight to an upper limit of 55, 65, 75, 85 or 95 weight percent. For example, the amount of PC in the blend may be in the range of from 50 to 95 weight percent, or in the alternative, the amount of PC in the blend may be in the range of from 55 to 85 weight percent, or in the alternative, the amount of PC in the blend may be in the range of from 75 to 95 weight percent.

All individual values and subranges from 5 to 50 percent by weight modified methyl methacrylate polymer are included herein and disclosed herein; for example, the amount of modified methyl methacrylate can be from a lower limit of 5, 15, 25, 35 or 45 weight percent to an upper limit of 10, 20, 30, 40 or 50 weight percent. For example, the amount of modified methyl methacrylate polymer in the blend may be in the range of from 5 to 50 weight percent, or in the alternative, the amount of modified methyl methacrylate polymer may be in the range of from 15 to 45 weight percent, or in the alternative, the amount of modified methyl methacrylate polymer may be in the range of from 5 to 25 weight percent.

The modified methyl methacrylate polymer useful in embodiments of the inventive blend is selected from the group consisting of modified methyl methacrylate homopolymer, modified methyl methacrylate copolymers and combinations thereof.

The term "modified" as used herein means that the methyl methacrylate polymer (modified methyl methacrylate homopolymer, modified methyl methacrylate copolymers or combinations thereof) has one or more end groups provided by reaction with one or more chain transfer agents selected from the group consisting of mercapto esters, cycloalkyl and substituted cycloalkyl thiols, hydroxyl thiols, aryl and substituted aryl thiols, and aminoalkyl thiols. Chain transfer agents utilized in the present invention are added to the free radical polymerization process. The use and mechanism of chain transfer agents is well known to those skilled in the art with the majority of the chain transfer agent ending up at the end of the polymer chain. By careful selection of chain transfer agent used in the polymerization of the (meth)acrylate monomers, the interaction of the polymethyl methacrylate with the polycarbonate may be influenced, giving a blend which has good scratch resistance, clarity and impact performance.

Mercapto esters, as the term is used herein, include those compounds having a moiety HS—X—C(=O)O—R or HS—X—OC(=O)R wherein X is a substituted or unsubstituted hydrocarbyl group having a valency of at least two, and R is an alkyl or aryl moiety. In embodiments of the inventive blend and/or method, one or more suitable mercapto esters may be used. In yet alternative embodiments of the inventive blend and/or method, no mercapto esters are used.

Exemplary mercapto esters include, but are not limited to, butylmercaptopropionate, methylmercaptopropionate, 2-ethylhexylthioglycolate, methylthioglycolate, ethylthioglycolate, mercaptoethyloleate, and mercaptoethyltallate, Exemplary cycloalkyl thiols and substituted cycloalkyl thiols include but are not limited to furfuryl mercaptan, cyclohexane thiol, and 2-furanmethane thiol.

Exemplary aryl and substituted aryl thiols include, but are not limited to, benzene thiol, benzyl mercaptan, 2 or 4 bromobenzyl mercaptan, 2,4,6-trimethyl benzyl mercaptan, 2 or 4-aminothiophenol, and thiophenol Exemplary hydroxyl alkyl thiols include, but are not limited to, 6-mercapto-1-hexanol, 4-mercapto-1-butanol, 8-mercapto-1-octanol. 1-thioglycerol, mercaptoethanol Exemplary amine thiols include, but are not limited to, 4-acetamidothiophenol, amionoethanethiol.

In an alternative embodiment, the instant invention provides a blend and method of producing the same, in accordance with any of the preceding embodiments, except that the polycarbonate is a Bisphenol A-type and/or commercial type polycarbonate having a weight average molecular weight (Mw) from 10,000 to 250,000 g/mole. All subranges and values from 10,000 to 250,000 g/mole are included herein and disclosed herein. For example, the polycarbonate may have a Mw from 10,000 to 250,000 g/mole, or in the alternative, the polycarbonate may have a Mw from 20,000 to 100,000 g/mole, or in the alternative, the polycarbonate may have a Mw from 30,000 to 90,000 g/mole, or in the alternative, the polycarbonate may have a Mw from 50,000 to 100,000 g/mole.

In an alternative embodiment, the instant invention provides a blend and method of producing the same, in accordance with any of the preceding embodiments, except that the chain transfer agent is selected from the group consisting of butylmercaptopropionate, methylmercaptopropionate, benzyl mercaptan, furfuryl mercaptan, 1-phenylethyl mercaptan, mercaptan, 2-ethylhexyl thioglycolate, and mercaptoethanol.

Modified methyl methacrylate copolymers useful in embodiments of the inventive blend include copolymers of methyl methacrylate and one or more comonomers selected from the group consisting of (cyclo)alkyl (meth)acrylates, alkyl (meth)acrylates, aryl (meth)acrylates, styrene, and substituted styrene based monomers. In particular embodiments of the inventive blend, the methyl methacrylate copolymer comprises units derived from one or more comonomers selected from the group consisting of cyclohexyl methacrylate, isobornyl methacrylate, tetrahydrofurfuryl methacrylate, cyclopentyl methacrylate, trifluoroethylmethacrylate, hydroxyethylmethacrylate and dicyclopentadienyl methacrylate.

The methyl methacrylate copolymer useful in certain embodiments of the inventive blend comprises equal to or greater than 70 percent by weight derived from methyl methacrylate units and from greater than one and equal to or less than 30 percent by weight derived from of one or more comonomers. All individual values and subranges from at least 70 percent by weight derived from methyl methacrylate units are included herein and disclosed herein; for example, the amount derived from methyl methacrylate units can be from a lower limit of 70, 75, 80, 85, 90, 95 or 98 weight percent. All individual values and subranges from greater than one to less than 30 percent by weight derived from one or more comonomer units are included herein and disclosed herein; for example, the amount derived from comonomer units can be from a lower limit of 1.5, 5, 10, 20, or 25 weight percent to an upper limit of 2, 7.5, 15, 25 or 29 weight percent.

In an alternative embodiment, the instant invention provides a blend and method of producing the same, in accordance with any of the preceding embodiments, except that the modified methyl methacrylate polymer has a Mw from 5,000 to 100,000 g/mole. All individual values and subranges from 5,000 to 100,000 g/mole are included herein and disclosed herein; for example, the Mw can be from a lower limit of 5,000; 25,000; 35,000; 45,000; 55,000; 65,000; 75,000; 85,000; or 95,000 g/mole to an upper limit of 10,000; 20,000; 30,000; 40,000; 50,000; 60,000; 70,000; 80,000; 90,000 or 100,0000 g/mole. For example, the Mw may be in the range of from 5,000 to 100,000 g/mole, or in the alternative, the Mw may be in the range of from 25,000 to 75,000 g/mole, or in the alternative, the Mw may be in the range of from 55,000 to 95,000 g/mole.

In an alternative embodiment, the instant invention provides a blend and method of producing the same, in accordance with any of the preceding embodiments, except that the inventive blend exhibits a pencil hardness equal to or greater than F measured according to ASTM D3363-05. All individual values and subranges from equal to or greater than F are included herein and disclosed herein; for example, the blend pencil hardness can be equal to or greater than F, or in the alternative, the blend pencil hardness can be equal to or greater than H.

In an alternative embodiment, the instant invention provides a blend and method of producing the same, in accordance with any of the preceding embodiments, except that a test sample made from the blend and measured according to ASTM D1003-11 has a haze of equal to or less than 50%. All individual values and subranges from equal to or less than 50% are included herein and disclosed herein; for example, the haze can be from an upper limit of 5%, 10%, 20%, 30%, 40% or 50%.

In an alternative embodiment, the instant invention provides a blend, and method of producing the same, in accordance with any of the preceding embodiments, except that the modified methyl methacrylate polymer is formed from the reaction of from 0.2 to 10 weight percent chain transfer agent based on the total weight of the methyl methacrylate polymer. All individual values and subranges from 0.2 to 10 weight percent are included herein and disclosed herein; for example, the amount of chain transfer agent used to form the modified methyl methacrylate polymer can be from a lower limit of 0.2, 0.5, 1, 2, 4, 6, 8, or 9 weight percent to an upper limit of 1, 3, 5, 7, 9, or 10 weight percent. For example, the amount of chain transfer agent used to form the modified methyl methacrylate polymer may be in the range of from 0.5 to 10 weight percent, or in the alternative, the amount of chain transfer agent used to form the modified methyl methacrylate polymer may be in the range of from 2 to 10 weight percent, or in the alternative, the amount of chain transfer agent used to form the modified methyl methacrylate polymer may be in the range of from 5 to 10 weight percent, or in the alternative, the amount of chain transfer agent used to form the modified methyl methacrylate polymer may be in the range of from 1 to 5 weight percent, In an alternative embodiment, the instant invention provides a blend and method of producing the same, in accordance with any of the preceding embodiments, except that the modified methyl methacrylate polymer has an index of refraction of less than 1.52, alternatively less than 1.51, alternatively less than 1.50.

In an alternative embodiment, the instant invention provides a blend and method of producing the same, in accordance with any of the preceding embodiments, except that the modified methyl methacrylate is prepared by one or more standard free radical polymerization techniques selected from the group consisting of emulsion polymerization, suspension polymerization, dispersion polymerization, bulk polymerization, and solution polymerization. In one embodiment, the modified methyl methacrylate polymer is prepared by solution polymerization.

The ingredients of the polymer blends can be mixed or blended using methods known to a person of ordinary skill in the art, preferably methods that can provide a substantially homogeneous distribution of the modified methyl methacrylate in the polycarbonate. Non-limiting examples of suitable blending methods include melt blending and melt kneading, for example, in an extruder, and the like.

In an alternative embodiment, the instant invention provides a blend, and method of producing the same, in accordance with any of the preceding embodiments, except that the blend has a pencil hardness of equal to or greater than F measured according to ASTM D3363-05.

In an alternative embodiment, the instant invention provides a blend and method of producing the same, in accordance with any of the preceding embodiments, except that the modified methyl methacrylate copolymer comprises equal to or greater than 70 percent by weight methyl methacrylate units and between greater than one, and equal to or less than 30 percent by weight of one or more monomers selected from the group consisting of, alkyl (meth)acrylates, aryl (meth)acrylates, styrene, substituted styrene based monomers.

In an alternative embodiment, the instant invention provides a blend and method of producing the same, in accordance with any of the preceding embodiments, except that the blend further comprises one or more components selected from the group consisting of flame retardants, pigments, primary antioxidants, secondary antioxidants, processing aids, impact modifiers, UV stabilizers, plasticizers, blends thereof, and combinations thereof.

In an alternative embodiment, the blend according to the present invention consists essentially of from 50 to 95 percent by weight polycarbonate; and from 5 to 50 percent by weight modified methyl methacrylate polymer, wherein the modified methyl methacrylate polymer is selected from the group consisting of methyl methacrylate homopolymer, methyl methacrylate copolymers and combinations thereof; wherein the modified methyl methacrylate polymer has one or more end groups of mercapto esters, cycloalkyl and substituted cycloalkyl thiols, hydroxyl thiols, aryl and substituted aryl thiols, and aminoalkyl thiols wherein the modified methyl methacrylate polymer has a Mw from 5,000 to 100,000 g/mole; and wherein the blend exhibits a pencil hardness equal to or greater than F measured according to ASTM D3363-05.

In yet another alternative embodiment, the instant invention further provides a method for improving scratch resistance of polycarbonate consisting essentially of: forming a blend by melt blending, the blend comprising from 50 to 95 weight percent polycarbonate and from 5 to 50 weight percent modified methyl methacrylate polymer; wherein the modified methyl methacrylate polymer has one or more end groups provided by reaction with one or more chain transfer agents selected from the group consisting of mercapto esters, cycloalkyl and substituted cycloalkyl thiols, hydroxyl thiols, aryl and substituted aryl thiols, and aminoalkyl thiols and wherein the modified methyl methacrylate polymer has a Mw from 5,000 to 100,000 g/mole; and wherein the blend exhibits a pencil hardness equal to or greater than F measured according to ASTM D3363-05.

In an alternative embodiment, the instant invention provides a blend, and method of producing the same, in accordance with any of the preceding embodiments, except that the blend is thermodynamically miscible at most composition ranges. As used herein, the term "thermodynamically miscible" refers to a polymer blend that is mixed on the molecular level forming a single, homogeneous phase which exhibits only one glass transition.

In an alternative embodiment, the instant invention provides a blend, and method of producing the same, in accordance with any of the preceding embodiments, except that the blend exhibits more than one glass transition.

In an alternative embodiment, the instant invention provides a blend, and method of producing the same, in accordance with any of the preceding embodiments, except that the blend does not comprise any units derived from a crosslinker. Such crosslinkers, which are not present in particular embodiments of the blend or used in embodiments of the method, include, for example, divinylbenzene; vinyl group-containing monomers including; allyl compounds including allyl (meth)acrylate, diallyl fumarate, diallyl phthalate, diallylacrylamide, triallyl (iso)cyanurate, and triallyl trimelitate; (poly)alkylene glycol di(meth)acrylate compounds including ethylene glycol dimethacrylate (EGDMA), diethylene glycol dimethacrylate, 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, and glycerol tri(meth)acrylate and mixtures and combination thereof.

EXAMPLES

The following examples illustrate the present invention but are not intended to limit the scope of the invention.

Example 1

Mod. MMA 1

Preparation of Methyl Methacrylate Polymer Using a Solution Polymerization Process 1000 g of methyl ethyl ketone (MEK) was charged to a 5 liter round bottom flask fitted with inlet ports and a condenser. The contents were heated to 75° C. while being agitated with a paddle type agitator at a rate of 90 rpm and gently swept with nitrogen. After 30 minutes of sweep 0.75 of TRIGONOX 125-C75 g was charged (tert-butyl peroxy pivalate, available from AkzoNobel Company) to the kettle; subsequently 750 g of methyl methacrylate, 7.7 g of Trigonox 150-C75 (in 47 g of MEK) and 37.7 g of butyl mercaptopropionate were fed as three different streams over 3 hours, while maintaining the temperature at 75° C.

After completion of the feeds, the contents of the reaction flask were heated to 80° C. and held at that temperature for 2 hrs. The typical conversion at this point is >98%. Subsequently, 3.4 g of TRIGONOX 150-C75 was added over a period of 2 hrs while the reaction flask is maintained at 80° C. Then the contents of the reaction flask were cooled to 50° C., poured into trays and dried to a solvent content of <5000 ppm. The resulting polymer mass was ground with a mortar and pestle and further dried to a solvent content less than <1000 ppm in a vacuum oven (<18" Hg and 75° C.). The isolated polymethyl methacrylate was compounded with LEXAN 141R in a counter rotating LEISTRITZ twin screw extruder operating at 100 rpm. The barrel temperature ranged from 248° C., to 265° C. at the die. The resulting strands were pelletized and dried overnight in a vacuum oven at 60° C. and injection molded in an ARBURG ALLROUNDER 221-75-350 model injection molding machine at a barrel temperature of 275° C. and a mold temperature of 65° C. Haze and pencil hardness were tested on the resulting specimens.

Inventive Example 2

Mod. MMA 2

Preparation of Copolymer of Methyl Methacrylate and Cyclohexyl Methacrylate 1000 g of toluene was charged to a 5 liter round bottom flask fitted with inlet ports and a condenser. The contents were heated to 11° C. while being agitated with a paddle type agitator at a rate of 90 rpm and gently swept with nitrogen. After 30 minutes of sweep, 0.94 g of TRIGONOX™ 21S g was added to the kettle and immediately a mixture of 780 g of methyl methacrylate and 160.6 g of cyclohexyl methacrylate, 9.6 g of TRIGONOX 21S (in 47 g of toluene) and 28.3 g of butyl mercaptopropionate were fed as three different streams over 3 hours, while the temperature was maintained at 110° C.

After completion of the feeds, the contents of the reaction flask were heated to 80° C. and held at that temperature for 2 hrs. The typical conversion at this point is >96%. Subsequently 4.3 g of TRIGONOX 21S was added and the contents of the reaction flask maintained at 110° C. Then the contents of the reaction flask were cooled to 50° C., poured into trays and dried to a solvent content of <5000 ppm. The resulting polymer mass was ground with a mortar and pestle and further dried till the solvent content was less than <1000 ppm in a vacuum oven (<18" and 75° C.). The isolated methyl methacrylate copolymer was compounded with LEXAN 141R in a counter rotating LEISTRITZ twin screw extruder operating at 100 rpm. The barrel temperature ranged from 248° C. to 265° C. at the die. The resulting strands were pelletized and dried overnight in a vacuum oven at 60° C. and injection molded in an ARBURG ALLROUNDER 221-75-350 model injection molding machine at a barrel temperature of 275° C. and a mold temperature of 65° C. The end groups were analyzed using H1 diffusion NMR and were found to be predominantly from the modifier. No noticeable domains were present in TEM's that were stained by Ruthenium Tetraoxide. Haze and pencil hardness were tested on the resulting specimens.

Inventive Example 11

Mod. MMA 11

The following emulsion polymerization process was used to prepare Example 11:

1200 gms deionized water, 0.20 gms NaEDTA (sodium salt of ethylene diamine tetra-acetate) and 0.04 gms s of iron sulfate heptahydrate were charged to a round bottom 5 liter glass reactor. The contents of the glass reactor were stirred at 100 rpm and heated to 47° C. while being sparged with nitrogen for 30 minutes. A monomer emulsion mixture of: (1) 2000 gms methyl methacrylate, 40 gms of butyl mercaptopriopionate, 960 gms of deionized water, and 182 gms of sodium dodecylbenzene sulfonate (10% solution), was then fed into the glass reactor over a period of 6 hours. At the same time, (2) a solution of 4.8 gms of sodium persulfate in 65 gms water, and (3) a solution of 1.6 gms of sodium formaldehyde sulfoxylate in 68.4 grams of water, were fed into the glass reactor over a period of 7 hours. That is, the feeds of components (2) and (3) continued for 1 hour following the termination of the feed of the monomer emulsion. During the feed of components (1), (2) and (3) the temperature of the mixture in the glass reactor was maintained at 47±2° C. After all of the components (1)-(3) were fed into the glass reactor, the temperature of the mixture in the glass reactor, a latex, was raised to 60° C. and held at that temperature for 30 minutes before cooling and filtering the resulting latex. The pH of the latex was adjusted to between 6.8 and 7.0 by adding a 0.6 wt % (based on total polymer) disodium phosphate solution (5% soln.) dropwise until the pH was brought into the desired range.

The polymer in the above latex was isolated by freeze drying at 60° C. to a moisture content of <0.5 percent by weight. The molecular weight of the resulting composition was measured with gel permeation chromatography and determined to be 10,000 g/mole (weight average).

The above PMMA-based component was melt blended with LEXAN 141R (a Bisphenol A-based polycarbonate resin) in a twin screw extruder at 280° C. The resulting strands were pelletized and injection molded into 3 mm thick plaques in an ARBURG ALLROUNDER 221-75-350 model injection molding machine at a barrel temperature of 275° C. and a mold temperature of 65° C. Haze and pencil hardness were tested in the resulting specimens. Table 1 below lists the composition, molecular weight and the calculated refractive index of a control example of LEXAN polycarbonate, exemplary modified methyl methacrylates (Mod. MMA) as used in the corresponding inventive blends and Comparative Mod MMA as used in the corresponding comparative blends.

TABLE 1

| EXAMPLE | Composition wt % | Mw | RI |
|---|---|---|---|
| LEXAN 141R Polycarbonate without additives (control) | polycarbonate | 49,000 | 1.58 |
| Mod. MMA 1 | 95.2% MMA/4.8% BMP | 6,400 | 1.49 |
| Mod. MMA 7 | 78.4% MMA/19.6% Dicycolpentadienyl methacrylate/2.0% % BMP | 11,400 | 1.52 |
| Mod. MMA 3 | 98% MMA/2% BMP | 12,000 | 1.49 |
| Mod. MMA 4 | 99% MMA/1% BMP | 21,000 | 1.49 |
| Mod. MMA 5 | 99.5% MMA/0.5% BMP | 46,000 | 1.49 |

TABLE 1-continued

| EXAMPLE | Composition wt % | Mw | RI |
|---|---|---|---|
| Mod. MMA 6 | 99.65% MMA/0.35% BMP | 38,000 | 1.49 |
| Mod. MMA 2 | 77.7% MMA/19.4% CHMA 2.9% BMP | 9,300 | 1.495 |
| Mod. MMA 8 | 78.4% MMA/19.6% CHMA 2 BMP | 13,200 | 1.495 |
| Mod. MMA 9 | 79.2% MMA/20% CHMA/ 0.8% BMP | 44,000 | 1.495 |
| Mod. MMA 10 | 79.7% MMA/20% CHMA/ 0.3% BMP | 76,000 | 1.495 |
| Comp. Mod. MMA 1 | 94.2% MMA/5.8% DDM | 6,400 | 1.49 |
| Mod. MMA 11 | 96.8% MMA/2% BMP | 14,000 | 1.49 |
| Mod. MMA 12 | 98% MMA/3.2% BMP | 10,000 | 1.49 |

Mod. MMAs 3, 4, 5 and 6 were prepared by solution polymerization following the procedure described to prepare example 1 (Mod. MMA 1) homopolymer composition, except the solvent in examples 3, 4, 5, 6 was toluene.

Examples 2, 8, 9, 10 and 13 were prepared by solution polymerization following the procedure described to prepare Example 2 (Mod. MMA 2) except the solvent in Mod. MMA 8 was methyl ethyl ketone.

Mod. MMA 11 and 12 were prepared by the emulsion polymerization procedure described to prepare Example 11 (Mod. MMA 11).

Table 2 illustrates the haze and pencil hardness of the various Mod. MMA and Comp. Mod. MMA, each melt blended with LEXAN 141R polycarbonate. LEXAN 141R is commercially available from SABIC Innovative Plastics (Pittsfield, Mass.).

TABLE 2

| Composition of Blend | | | | | Total impact |
|---|---|---|---|---|---|
| LEXAN141 R Polycarbonate | Mod. MMA | Blend | Haze | Pencil hardness | (energy to break. ft lbf) |
| 100% PC (control) | 0 | | 1.2 | 2B | 45 |
| 70 wt % PC | 30 wt % Mod. MMA 1 | Inv. Blend 1 | 0.8 | H | 4.4 |
| 70 wt % PC | 30 wt % Mod. MMA 7 | Inv. Blend 7 | 1.3 | F | 29 |
| 70 wt % PC | 30 wt % Mod. MMA 3 | Inv. Blend 3 | 3.6 | F | 16 |
| 70 wt % PC | 30 wt % Mod. MMA 4 | Inv. Blend 4 | 102 | H | 30 |
| 70 wt % PC | 30 wt % Mod. MMA 5 | Inv. Blend 5 | 102 | F | 43 |
| 70 wt % PC | 30 wt % Mod. MMA 6 | Inv. Blend 6 | 102 | F | 44 |
| 70 wt % PC | 30 wt % Mod. MMA 2 | Inv. Blend 2 | 0.9 | H | 1 |
| 70 wt % PC | 30 wt % Mod. MMA 8 | Inv. Blend 8 | 1.1 | H | 2 |
| 70 wt % PC | 30 wt % Mod. MMA 9 | Inv. Blend 9 | 102 | F | 31 |
| 70 wt % PC | 30 wt % Mod. MMA 10 | Inv. Blend 10 | 102 | F | 40 |
| 70 wt % PC | 30 wt % Comp. Mod. MMA 1 | Comp. Blend 1 | 0.7 | HB | 1.3 |

TABLE 2-continued

| Composition of Blend | | | | | Total impact |
|---|---|---|---|---|---|
| LEXAN141 R Polycarbonate | Mod. MMA | Blend | Haze | Pencil hardness | (energy to break. ft lbf) |
| 90 wt % PC | 10% Mod. MMA 11 | Inv. Blend 11 | 31 | F | 38 |
| 80 wt % PC | 20 wt % Mod. MMA 12 | Inv. Blend 12 | 16 | H | 24 |
| 70 wt % PC | 30 wt % Mod. MMA 12 | Inv. Blend 13 | 48 | H | 1.0 |

Test Methods

Pencil Hardness

Hardness, as used herein, refers to hardness as determined according to ASTM D3363-05 "Standard Test Method for Film Hardness by Pencil Test." This standard test would be followed except that the test would be conducted on an injection molded test specimen in the shape of a plaque with dimensions 3×50×50 mm. The pencil would be held at a 45° angle and drawn across the surface of the plaque away from the operator starting with the hardest pencil with a load of 750 g. The substrate hardness would be reported as the hardness of the hardest pencil that did not scratch the surface. The pencil hardness scale from softer to harder is 2B, B, HB, F, H, 2H, 3H, etc.

GPC

The term "molecular weight" as used refers to peak average molecular weight as determined by gel permeation chromatography against narrow molecular weight polystyrene standards in tetrahydrofuran solvent at 25° C. using Polymer Laboratories' data manipulation software.

DSC

The glass transition is measured in a TA INSTRUMENTS Q1000 Differential Scanning calorimeter using a small sample of the polymer (5-20 mg) sealed in a small aluminum pan. The pan is placed in the DSC apparatus, and its heat flow response is recorded by scanning at a rate of 10° C./min from room temperature up to 180° C. The glass transition temperature is observed as a distinct shift in the heat flow curve.

Haze

ASTM Standard Test Method for Haze and Luminous Transmittance of Transparent Plastics, D1003-11 was used for measuring the haze values of different specimens.

Impact Resistance

ASTM Standard Test Method for Impact Resistance of Flat Rigid Plastic Specimens by Means of a Falling Dart, D5628-10 was used to determine the impact resistance of the different specimens.

The present invention may be embodied in other forms without departing from the spirit and the essential attributes thereof, and, accordingly, reference should be made to the appended claims, rather than to the foregoing specification, as indicating the scope of the invention.

We claim:

1. A blend consisting essentially of:
   from 50 to 95 percent by weight polycarbonate; and
   from 5 to 50 percent by weight modified methyl methacrylate polymer,
      wherein the modified methyl methacrylate polymer is prepared by solution polymerization, and wherein the modified methyl methacrylate polymer is selected from the group consisting of (a) modified methyl methacrylate homopolymers, (b) modified methyl methacrylate copolymers consisting essentially of from 77.7 to 78.4 percent by weight units derived from methyl methacrylate, from 2 to 2.9 percent by weight of butyl mercaptopropionate, and from 19.4 to 19.6 percent by weight of cyclohexyl methacrylate, and (c) combinations thereof;
   wherein the modified methyl methacrylate polymer has one or more mercapto ester end groups provided by reaction with the butyl mercaptopropionate chain transfer agent, and aminoalkyl thiols; and
   wherein the modified methyl methacrylate polymer has an Mw from 9,300 to 13,200 g/mole; and
   wherein the blend exhibits a pencil hardness equal to or greater than F measured according to ASTM D3363-05, and wherein the blend has a haze of equal to or less than 5%, measured according to ASTM D1003.

2. The blend according to claim 1, wherein the modified methyl methacrylate polymer has a refractive index less than 1.52.

3. A method for improving the scratch resistance of polycarbonate comprising:
   forming a blend by melt blending, the blend consisting essentially of from 50 to 95 weight percent polycarbonate and from 5 to 50 weight percent modified methyl methacrylate polymer;
   wherein the modified methyl methacrylate polymer is prepared by solution polymerization, and wherein the modified methyl methacrylate polymer is (a) a modified methyl methacrylate homopolymer, (b) a modified methyl methacrylate copolymer consisting essentially of from 77.7 to 78.4 percent by weight units derived from methyl methacrylate, from 2 to 2.9 percent by weight of butyl mercaptopropionate, and from 19.4 to 19.6 percent by weight of cyclohexyl methacrylate, or (c) combination thereof, having one or more end groups provided by reaction with one or more chain transfer agents selected from the group consisting of mercapto esters, cycloalkyl and substituted cycloalkyl thiols, hydroxyl thiols, aryl and substituted aryl thiols, and aminoalkyl thiols; and
   wherein the modified methyl methacrylate polymer has a Mw equal from 9,300 to 13,200 g/mole; and
   wherein the blend exhibits a pencil hardness equal to or greater than F measured according to ASTM D3363-05, and wherein the blend has a haze of equal to or less than 5%, measured according to ASTM D1003.

4. The method according to claim 3, wherein the blend has a refractive index of less than 1.52.

* * * * *